Dec. 9, 1969 A. B. AMIDON ET AL 3,482,973

IMAGING SYSTEM

Filed Oct. 1, 1965

INVENTORS
ALAN B. AMIDON
CARL BRYNKO
BY Ronald Zibelli
James J. Ralabate
ATTORNEYS United States Patent Office 3,482,973
Patented Dec. 9, 1969

3,482,973
IMAGING SYSTEM
Alan B. Amidon, Penfield, and Carl Brynko, West Webster, N.Y., assignors to Xerox Corporation, Rochester, N.Y., a corporation of New York
Filed Oct. 1, 1965, Ser. No. 491,940
Int. Cl. G03c 5/04
U.S. Cl. 96—35 11 Claims

ABSTRACT OF THE DISCLOSURE

An image is formed by exposing an imaging member comprising an organic photochromic material in a resin matrix to actinic electromagnetic radiation in image configuration to convert at least a portion of the photochromic material from one photochromic state to another such that a marked difference in molecular internal energy exists between the exposed and unexposed areas of the said member in order to form a latent image and softening the matrix with a solvent to photochromic material in areas having higher molecular energy to expand the matrix to form a raised image.

This invention relates in general to a novel imaging system and, more specifically, to a volume change imaging system employing light induced changes in the level of excitation or organic photochromic compounds.

Materials which undergo reversible photo-induced color change are referred to as photochromic. In the absence of actinic radiation, these materials have a relatively stable configuration with a characteristic absorption spectrum. However, when a photochromic material is exposed to actinic radiation such as ultra-violet light, the absorption spectrum changes drastically so that the appearance of the material changes from colorless to red, red to green or the like. These property changes are believed to occur because of the changes in the molecular or electronic configuration of the material from a lower to a higher energy state. These changes occur because the photochromic materials generally have very efficient routes for the internal conversion of absorbed, excited state electronic energy into vibrational and torsional twisting modes of the molecule upon exposure to light. This conversion may, for example, result in the isomerization of the molecule. The conversion of each molecule normally takes place at an extremely rapid speed but actual observation of a change in color in conventional systems takes longer because of the relatively low concentration produced per unit time and the depletion of the excited colored form by the competing but slower reconversion to the lower unexcited form. Accordingly, photochromic materials of lower conversion efficiency tend to produce pale color changes at best.

Unfortunately, the higher colored form of the photochromic material exists in an excited, unstable condition which reverts to the lower form with its original absorption band and color after the source of actinic radiation is removed. Since imaging techniques proposed in the prior art employ the color change to make the image, these materials cannot be used in permanent imaging systems. Although an enormous amount of time, money and effort has been expended by many research organizations in attempting to stabilize the higher forms of a great many different photochromic compounds so as to make them suitable for use in practical imaging systems and, although some success has been achieved in slowing down the reconversion of the higher to the lower form of some photochromic compounds with various modifications of their substituents, no one has to date yet succeeded in permanently stabilizing these higher forms. Additional effort has been devoted to the problem of achieving maximum color change from the lower to the higher form of various photochromic compounds, but even had these goals been achieved, the problem of deactivating the lower form of photochromic material in background areas would still remain. In essence then, there have been two fixing problems in photochromic imaging involving both the stabilization of the higher colored form in exposed areas and the deactivation of the lower uncolored form in background areas of the image, and neither of these problems has been effectively solved. Consequently, the phenomenom of photochromisn has remained largely a laboratory curiosity rather than an effective and commercially acceptable means of imaging.

It is accordingly an object of this invention to provide a novel imaging system.

It is a further object of the present invention to provide a novel imaging method based on the use of organic photochromic compounds.

Another object of this invention is to provide an imaging system which can effectively employ even these photochromic materials which exhibit little or no visible change in color on exposure.

A still further object of the invention is to provide an imaging method and apparatus utilizing photochromic compounds in which the image generated by imagewise exposure of the compound serves only as a temporary latent image for the developing and fixing steps which produce the permanent image that in no way depends upon the permanency of the higher form of the photochromic compound itself.

Yet another object of this invention is to provide a novel imaging method and apparatus in which photochromic compounds are employed in an imaging system in which the higher level of internal energy in the exposed form of photochromic compounds is used to produce a raised image.

The above and still further objects of the present invention are accomplished, generally speaking, by providing a system in which a photochromic layer composed of a photochromic compound in a matrix is exposed to an image with actinic electromagnetic radiation. This exposure may constitute a source of visible light, ultraviolet light, X-ray or any other radiation source which is capable of converting the particular photochromic compound from one form to the other. Imagewise conversion of at least a portion of the photochromic layer from one state to the other forms a latent image because of the marked difference in internal absorbed energy between the two states of the photochromic compound. It should be emphasized here that the exposure need only convert enough photochromic molecules to produce a significant difference between the molecular internal energy in the exposed and unexposed areas. Because of the relatively small number of molecules which must be converted to fulfill this requirement with some materials, a visible color change need not necessarily be produced in all instances. The latent image on the photochromic layer is then developed by contacting the photochromic layer with sufficient solvent or solvent vapor to soften the matrix so as to release the excited molecules in exposed areas from the solid matrix in which they are originally trapped.

Since the excited form of the photochromic compound has, by definition, absorbed a significant amount of energy resulting in a pronounced vibrational excitation, change to a larger volume isomeric form or both, the effective volume occupied by it is significantly larger than that of the unexposed, unexcited form of the same material. The excited form of the photochromic compound is, however, held constrained in the rigid matrix until the solvent penetrates and softens this matrix. Then the strain of the light induced volume increase is released by expansion in the image area, causing surface contour change at that point. When the photochromic layer with the expanded image thereon is removed from contact with the solvent and the solvent is allowed to evaporate off, the matrix rehardens, thereby freezing or fixing the image thus produced. The image may then be stored as such and once the need for any particular image has ended, the imaging member may be reused by merely softening the photochromic-resin matrix layer and smoothing it out or recoating it from solution on a supporting substrate. Although the image formed may be viewed by any suitable technique, such as light scattering or the like, it has been found that preferred methods for viewing images formed according to this technique involves viewing them by interference or phase contrast as is an interference or phase contrast microscope. The image formed is of a contour type that is to say, the area of the photochromic layer which is exposed to exciting radiation is raised above the level of the background upon softening with solvent. The system is extremely desirable for microimaging as it has been found to be capable of resolving 225 line pairs per millimeter with certain material producing a height increase in image areas equal to roughly 30 percent of the total thickness of the relatively thin films which are used.

In order that the invention will be more clearly understood, reference is now made to the accompanying drawings in which an embodiment of the invention is illustrated by way of example in which.

Figure 1:
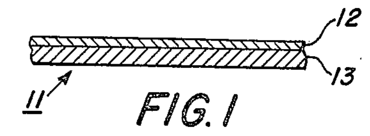
FIGURE 1 is a side sectional view of one imaging member made according to the invention.

Referring now to FIGURE 1, there is seen an exemplary imaging member generally designated 11 made up of a photochromic layer 12 on a substrate 13 which may optionally be provided for strength and physical integrity to the whole imaging member during the process. The photochromic material in layer 12 is dissolved in or dispersed in a matrix such as a resin. Any suitable resin may be used. Typical resins include Staybelite Ester 10 and Pentalyn H, glycerol and pentaerythritol, esters respectively, or partially (50%) hydrogenated rosin sold by the Hercules Powder Co. of Wilmington, Del.; Velsicol EL–11, a terpolymer of styrene, indene and isoprene, marketed by the Velsicol Chemical Co. of Chicago, Ill.; polyalpha-methyl styrene; Piccolyte S–70 and S–100 (polyterpene resins made predominately from beta pinene available from the Pennsylvania Industrial Chemical Co. and having ring and ball melting points of 70° C. and 100° C., respectively); Piccopale 70SF and 85 (nonreactive olefin-diene resins, available from the Pennsylvania Industrial Chemical Co. having melting points of 70°C. and 85° C. and molecular weights of 800 and 100, respectively); Piccodiene 2212 (a styrene-butadiene resin available from the same company); Piccolastic A–75, D–100 and E–100 (polystyrene resins with melting points of 75° C., 100° C. and 100° C. available from the same company); Neville R–21, R–9 and Nevillac Hard (comarone-indene resins); Amberol ST137X (an unreactive, unmodified phenolformaldehyde resin available from Rohm & Hass); ethyl cellulose; ethyl hydroxy cellulose; nitrocellulose; ethyl acrylate polymer, methyl acrylate polymer; methyl methacrylate polymer; Carboset XH–1 (an acrylic acid polymer available from B. F. Goodrich Co.; Pliolite AC (a styrene-acrylate copolymer); Pliolite VTAC (a vinyl toluene acrylate copolymer); Neolyn 23 (an alkyd resin available from Hercules Powder Co.) chlorinated rubber, paraffin wax; polycarbonates; polyurethanes; epoxies; polyvinyl chloride; polyvinylidene chloride; polyvinyl butyral; shellac; amine formaldehydes, polyvinyl acetals, silicones phenoxies; polyvinyl fluorides, other naturan and synthetic resins and mixtures and copolymers thereof.

As stated above, the percentage of photochromic compound in layer 12 may range anywhere from 80% by weight of photochromic compound down to about 1% by weight of photochromic with the remainder being a resin of the type described herein. Any suitable photochromic compound may be employed. Typical photochromic compounds include:

Spiropyrans such as 1,3,3-trimethyl-6′-nitro-8′-allyl-spiro (2″H-1′-benzopyran-2,2′-indoline);
1,3,3-trimethyl-5,6′-dinitro-spiro (2′H-1′-benzopyran-2,2′-indoline);
1,3,3-trimethyl-7′-nitro-spiro (2′H-1′-benzopyran-2,2′-indoline);
3-methyl-6-nitro-spiro-[2H-1-benzopyran-2,2′-(2′H-1′-beta-naphthopyran)];
1,3,3-trimethyl-8′-nitro-spiro (2′H-1′-benzopyran-2,2′-indoline);
1,3,3-trimethyl-6′-methoxy-8′-nitro-spiro (2′H-1′-benzopyran-2,2′-indoline);
1,3,3-trimethyl-7-methoxy-7′-chloro-spiro (2′H-1′-benzopyran-2,2′-indoline);
1,3,3-trimethyl-5-chloro-5′-nitro-8′-methoxy-spiro (2′H-1′-benzopyran-2,2′-indoline);
1,3-dimethyl-3-isopropyl-6′-nitro-spiro (2′H-1′-benzopyran-2,2′-indoline);
1-phenyl-3,3-dimethyl-6′-nitro-8′-methoxy-spiro (2′H-1′-benzopyran-2,2′-indoline);
7′-nitro-spiro-[xantho-10,2′ (2′H-1′-benzobetanapthopyran)];
3,3′-dimethyl-6-nitro-spiro (2′H-1′-benzopyran-2,2′-benzothiazole);
3,3′-dimethyl-6′-nitro-spiro (2′H-1′-benzopyran 2,2′-benzo-oxazole);
1,3-trimethyl-6-nitro-spiro (2′H-1′-benzopyran-2,2′-indoline);
6′-nitro-8′-methoxy-1,3,3-trimethylindolinobenzopyrylospiran;
6′-nitro-1,3,3-trimethyl-indolinobenzopyrylospiran;
8′-allyl-1,3,3-trimethylindolinobenzopyrylospiran;
8′-carbomethoxy-1,3,3-trimethylindolinobenzopyrylospiran;
8′-methoxy-1,3,3-trimethylindolinobenzopyrylospiran;
6′,8′-dinitro-1,3,3-trimethylindolinobenzopyrylospiran;
7′-nitro-1,3,3-trimethylindolinobenzopyrylospiran;
8′-nitro-1,3,3-trimethylindolinobenzopyrylospiran;
6′-8′-dibromo-1,3,3-trimethylindolinobenzopyrylospiran;
6′-chloro-8′-nitro-1,3,3-trimethylindolinobenzopyrylospiran;
5-nitro-6′-nitro-1,3,3-trimethylindolinobenzopyrylospiran;
6′-nitro-8′-fluoro-1,3,3-trimethylindolinobenzopyrylospiran;
6′-methoxy-8′-nitro-1,3,3-trimethylindolinobenzopyrylospiran;
5′-nitro-8′-methoxy-1,3,3-trimethylindolinobenzopyrylospiran;
6′-bromo-8′-nitro-1,3,3-trimethylindolinobenzopyrylospiran.

Anthrones such as bianthrone;
xanthylideneanthrone;
4,4′-methylanthrone;
4,4′-methoxybianthrone;
3-chloro-10-(9′-xanthylidene)-anthrone;
3-methyl-10-(9′-xanthylidene)-anthrone;
4′-chloro-10-(9′-xanthylidene)-anthrone;
and 10′-9′-2′-methyl xanthylidene)-anthrone, Sydnones such as N-(3-pyridyl)-sydnone;
N-benzylsydnone;

N-p-methylbenzyl-sydnone;
N-3,4-dimethylbenzylsydnone;
N-p-chlorobenzylsydnone;
N,N′-ethylene-bissydnone and
N,N′-tetramethylenebisydnone.

Anils such as salicylidene aniline;
5-bromo salicylidene-alpha-naphthylamine;
salicylidene-m-phenylenediamine;
salicylidene-m-phenylenediamine;
salicylidene-m-toluidene;
salicylidene 3,4-xylidene;
salicylidene-p-anisidine;
o-nitrobenzidene-p-aminobiphenyl;
o-nitrobenzidene-m-nitroaniline;
o-nitrobenzidene-p-phenetidine;
salicylidene-p-aminobenzoic acid;
p-hydroxy benzidene-p-bromoaniline;
p-hydroxy-benzidene 2,4-xylidine 2-hydroxy-3-methoxy-benzidene 2,5-xylidine; and
salicylidene-o-chloroaniline.

Hydrazones such as the 2,4-dinitro-phenylhydrazone of 5-nitro-salicylaldehyde;
benzaldehyde beta-naphthyl-hydrazone;
benzaldehyde anislhydrazone benzaldehyde-m-chlorophenylhydrazone;
benzaldehyde-p-bromophenylhydrazone;
cinnamaldehyde phenylhydrazone;
cinnamaldehyde beta-naphthylhydrazone;
cinnamaldehyde m-tolylhydrazone;
cinnamaldehyde p-tolylhydrazone;
cinnamaldehyde 3,4-xylylhydrazone;
p-dimethylamino benzaldehyde beta-naphthylhydrazone;
2-furaldehyde beta-naphthylhydrazone;
1-phenol-1-hexen-3-one-phenylhydrazone;
piperonal and anisylhydrazone;
piperonal m-chlorophenylhydrazone;
piperonal beta-naphthylhydrazone;
piperonal m-tolylhydrazone;
p-tolualdehyde phenylhydrazone;
vanillin beta-naphthylhydrazone.

Osazones such as benzyl beta-naphthyl-osazone;
benzyl-m-tolylosazone;
benzyl 2,4-xylylosazone;
4,4′-dimethoxy benzyl beta-naphthylosazone;
4,4′-dimethoxy benzyl phenylosazone;
4,4′-dimethoxy benzyl-2,4-xylylosazone;
3,4,3′,4′-bis(methylenedioxy) benzyl alpha-naphthylosazone;
3,4,3′,4′-bis(methylenedioxy) benzyl 2,4-xylylosazone.

Semicarbazones such as chalcone semicarbazone;
chalcone phenyl semicarbazone;
2-nitrochalcone semicarbazone;
3-nitrochalcone semicarbazone;
cinnamaldehyde semicarbazone;
cinnamaldehyde thiosemicarbazone;
o-methoxy cinnamaldehyde semicarbazone;
o-methoxy cinnamaldehyde thiosemicarbazone;
o-methoxy cinnamaldehyde phenylsemicarbazone;
1-(4-methoxyphenyl)-5-methyl-1-hexen-3-one-semicarbazone;
1-(1-naphthyl)-1-hexen-3-onesemicarbazone;
1-phenyl-1-penten-3-one-semicarbazone.

Stilbene derivatives such as 4,4′-diformamido-2,2′-stilbene disulfonic acid 4,4′-diacetamido-2,2′-stilbene disulfonic acid and its sodium, potassium barium, strontium, calcium, magnesium and lead salts;

4,4′-bis(4-acetamidobenzoyleneamido)-2,2′-stilbene disulfonic acid;
4,4′-bis(p-(p-acetamido-benzamido)benzamido)-2,2′-stilbene disulfonic acid.

Fulgides (substituted succinic anhydrides) such as alpha-anisyl-gamma-phenyl fulgide;
alpha,gamma-dianisyl fulgide;
alpha,gamma-dicumyliso fulgide;
alpha,gamma-diphenyl fulgide;
alpha,gamma-distyryl fulgide;
alpha-piperonyl-gamma-phenyl fulgide;
tetraphenyl fulgide.

Amino-camphor compounds such as 3-(p-dimethyl aminophenylamino)-camphor and 3-(p-diethylaminophenylamino)-camphor.

Thio indigo dyes; o-nitrobenzyl derivatives such as 2-(2′-4′-dinitrobenzyl pyridine;
2,4,2′-trinitrodiphenylmethane;
2,4,2′,4′-2″,4″-hexanitrotriphenylmethane;
ethyl bis-(2,4-dinitrophenyl) acetate;
2-(2′-nitro-4′-carboxybenzyl pyridine;
3,3′-dinitro-4,4′-bis (2-pyridylmethyl)-azoxybenzene; and
4-(2′-nitro-4′-cyanobenzyl pyridine.

The spiropyrans are, however, a preferred class of materials owing to their superior and more sensitive imaging capabilities. Any convenient technique such as dip coating, extrusion, whirl coating, casting or the like using either a hot melt or a solution of the materials to be coated may be employed for applying layer 12 to the substrate.

Figure 1A:
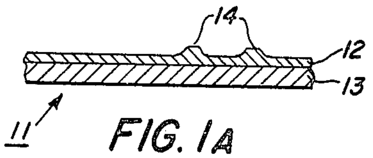
FIGURE 1A is a side sectional view of the imaging member of FIGURE 1 after imaging is completed.

In FIGURE 1A, a cross-sectional view of the imaging member of FIGURE 1 is shown as it appears after the completion of the process. Like numerals are employed in this figure to identify elements which are the same as those shown in FIGURE 1. However, the expanded image areas 14 are also shown as they appear on the surface of the imaging web.

Figure 2:
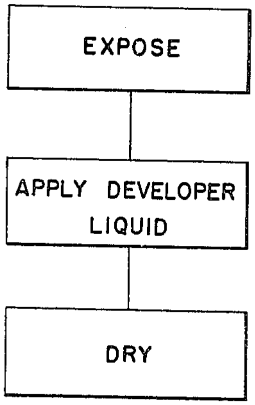
FIGURE 2 is a flow diagram of the process steps of the invention.

As shown in FIGURE 2, the basic steps involved in carrying out the process of this invention involve exposing the photoresponsive imaging member 11 to an image-wise pattern of actinic electromagnetic raidation, treating the exposed layer with a solvent and drying the raised or relief pattern formed to make it permanent. In exposing to the image to be reproduced any source of electromagneic radiation which is actinic to the photochromic material may be employed. In the case of most photochromic compounds in their lower or unexcited forms an ultraviolet radiation source may be conveniently employed to expose the material in image-wise configuration so as to convert exposed areas to the higher or excited form of the material, although light of this short wavelength is not always required. Since many photochromic materials in their higher or excited forms may be "triggered" or caused to revert to the lower unexcited form by exposure to visible light, a light source in the visible range (from about 4000–7500 angstrom units) may be conveniently employed for image-wise exposure of a photochromic film which had initially been uniformly converted to the higher or excited form. This type of exposure will then convert exposed areas to the unexcited or lower form of the photochromic material while the background or unexposed areas remain in the excited form. Providing that the image is developed before the background areas of the photochromic material revert to the lower unexcited form, this technique may be conveniently employed for positive to negative imaging. The intensity of the exposure need not necessarily be strong enough to produce an intense color change in the photochromic compound since with most materials this requires a conversion of a gross amount of the photochromic from one form to the other, while to be operative in the process of this invention only enough photochromic material must be converted so that a differential pattern can be formed on the imaging layer 13. The term "photochromic" should be understood in this context as it is used throughout the specification and claims.

Once exposure is complete the imaging member is exposed to the developing vapor before the excited molecules revert to their lower unexcited form. Any suitable solvent which will soften the matrix may be employed. Typical solvents include cyclohexanol, methylene chloride, carbon tetrachloride, trichloroethylene, ethyl acetate, butyl acetate, diethyl ether, dioxane, tetrahydrofuran, trichloro monofluoromethane tetrachlorodifluoromethane, benzene, xylene, cyclohexane, naphtha, turpentine, acetone, methylethyl ketone, cyclohexanone, etc. Although any suitable technique may be employed for applying the solvents, spraying or passing the imaging member through a solvent vapor atmosphere are preferred so as to allow for the application of just sufficient solvent to soften the imaging matrix without completely resolving it into a liquid. The selection of the particular solvents to be employed, will, of course, depend largely upon the particular matrix being used. Since it is the object of the solvent treatment to soften rather than to completely dissolve the matrix, it is also to be understood that the term "solvent" as used in this application and the appended claims is intended to include relatively weak solvents which are often referred to as swelling agents. Once the imaging layer has been sufficiently softened by the solvent treatment to allow for the change in surface contour to take place in image configuration, the imaging member is removed from contact with the solvent and residual solvent is allowed to dry off by evaporation thereby freezing the raised image in place in the imaging member.

Figure 3:
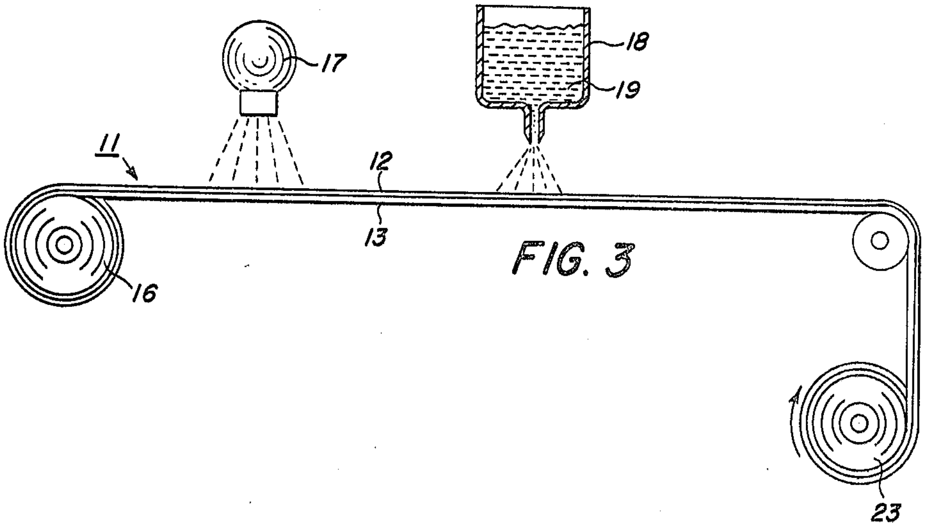
FIGURE 3 is a side sectional view of an illustrative embodiment of an apparatus adapted for imaging according to the invention.

In FIGURE 3, there is illustrated a simple exemplary apparatus for carrying out the imaging technique of the invention. In this apparatus imaging web 11 comes off a supply roll 16 and passes under a projector 17 which projects a pattern of light and shadow corresponding to the image to be reproduced with an actinic light source on the photochromic layer of the imaging web 11 so as to convert the photochromic material included therein from one photochromic state to another in image-wise configuration. Following exposure, imaging web 11 passes beneath a vapor applicator 18 which deposits a small amount of solvent vapor uniformly over its surface. This solvent swells and softens the layer of imaging material allowing expansion and change in surface contour to take place in areas containing the excited form of the photochromic. The developed image on imaging web 11 is then rewound on take-up roll 23 after the solvent dries off. The following illustrative examples of preferred embodiments of the invention are now given to enable those skilled in the art to more clearly understand and practice the invention described above. Unless otherwise indicated, all parts and percentages are taken by weight.

Example I

Four grams of 6'-nitro-1,3,3-trimethylindolinobenzopyrylospiran and 8 grams of Amberol ST-137X resin (described above) are dissolved in 88 grams of toluene. This solution is dip coated in the dark to a thickness of about 2 microns on an aluminum plate and air dried. The dried layers are then contact exposed to an image transparency with a 9-watt fluorescent light available from the Eastern Corporation of Westbury Long Island under the tradename "Blacklite" using a filter which passes about a 10 angstrom bandwidth centered on 3660 angstroms. After image-wise exposure a maroon colored image is seen to form on the film which is then treated with xylene vapor. The xylene penetrates and swells the entire layer allowing image areas to swell on the surface. On drying, the exposed areas become fixed and inspection indicates that image areas are swollen about ⅓ above the thickness of the layer.

Examples II and III

The procedure of Example I is repeated with the exception that in Example II 4 grams of the resin and ½ gram of the 6-nitro-1,3,3-trimethylindolinobenzopyrylospiran are used in the coating solution while in Example III the ratio is 1 gram of resin to 2 grams of the same photochromic spiran compound. Each of these produce about equal results with those produced by Example I, except that Example III produces a higher swelling in image areas.

Examples IV–XV

The procedure of Example I is followed exactly with the exception that the following resins are substituted for the Amberol resin of Example I in Examples IV–XV, respectively; Piccolyte S–70, Piccolyte S–100, Piccopale 70SF, Piccopale 85, Piccodiene 2212, alphamethylstyrene polymer, Staybelite Ester 10, Piccolastic D–100, Piccolastic E–100, Neville R–9, Neville R–21, and Nevillac Hard. All produce about the same results as Example I.

Examples XVI–XVIII

In Examples XVI and XVII the procedure of Example I is repeated except that the photochromic compound employed is 3-N-pyridyl sydone in Example XVI, and, in Example XVII, bianthrone is employed; and, in Example XVIII 3-N-pyridyl salicylidene is employed. In these examples the procedure of Example I is followed except that the same filter is employed with a 100 watt light source for a 20 minute exposure. In all instances the images formed are about equal in quality with the one produced by the procedure of Example I.

Example XIX

The procedure of Example I is repeated exactly except that the coated film is first uniformly exposed to the 3660 angstrom light source until it achieves a deep maroon color. Following this exposure, a transparency to be reproduced is overlaid on the imaging layer and exposed to a source of yellow light for one hour which serves to bleach or reconvert the excited form of the photochromic compound back to its unexcited colorless form in exposed areas. The development step of Example I is then carried out resulting in a photographic reversal of the original transparency.

Examples XX–XXV

The procedure of Example I is followed with the exception that the following photochromic compounds are used respectively, in Examples XX–XXV in place of the spiropyran photochromic compound of Example I: benzil betanaphthylosazone; 2-nitrochalcone semicarbazone; alpha, gamma-diphenyl fulgide; 4,4'-diformamido-2,2'-stilbene disulfonic acid; 3-(p-dimethylaminophenylamino)-camphor; and 2-(2',4'-dinitrobenzyl) pyridine. These produce essentially the same results as Example I when a 20 minute exposure is employed.

Although specific materials and conditions are set forth in the above examples, these are merely illustrative of the present invention. Various other materials, such as any of the typical photochromic and/or resins listed above which are suitable, may be substituted for the materials listed in the examples with similar results. The films of this invention may also have other materials mixed, dispersed, copolymerized or otherwise added thereto to enhance, sensitize, synergize, or otherwise modify the properties thereof. Many modifications and/or additions to the process will readily occur to those skilled in the art upon reading this disclosure, and these are intended to be encompassed within the spirit of the invention.

What is claimed is:

1. A photographic method comprising exposing an imaging member comprising an organic photochromic material in a resin matrix to a pattern to be reproduced with an actinic electromagnetic radiation source of sufficient energy and for a sufficient time to convert at least a sufficient portion of said photochromic material from one photochromic state to another such that a marked difference in molecular internal energy exists between the exposed and unexposed areas of the said member in order to form a latent image and softening said matrix with a solvent to allow the photochromic material in areas having higher molecular internal energy to expand said matrix so as to form a raised image.

2. A method according to claim 1 in which said photochromic material is initially in its lower, unexcited state including exposing said imaging member with an electromagnetic radiation source of sufficient energy to convert exposed areas thereof to a higher excited photochromic state.

3. A method according to claim 1 in which said photochromic material is initially in its higher excited state including exposing said imaging member with an electromagnetic radiation source of sufficient energy to convert exposed areas thereof to a lower unexcited photochromic state.

4. A method according to claim 3 including exposing said imaging layer to a pattern to be reproduced with a visible light source capable of causing said photochromic material to return to the lower unexcited state in exposed areas.

5. A method according to claim 1 further including fixing said image by drying off said softening solvent.

6. A method according to claim 1 further including erasing said image by softening said imaging member.

7. A photographic method comprising exposing an imaging member comprising a photochromic 1,3,3-trimethylindolinobenzopyrylospiran in a resin matrix to a pattern to be reproduced with an actinic electromagnetic radiation source of sufficient energy and for a sufficient time to convert at least a portion of said material from one photochromic state to another such that a marked difference in molecular internal energy exists between the exposed and unexposed areas of the said member in order to form a latent image and softening said matrix with a solvent to allow the photochromic material in areas having higher molecular internal energy to expand said matrix and form a raised image.

8. A method according to claim 6 in which said photochromic material comprises 6′ - nitro - 1,3,3 - trimethylindolinobenzopyrylospiran.

9. A photographic method comprising exposing an imaging member comprising a solid solution of an insulating resin and an organic photochromic material to a pattern to be reproduced with an actinic electromagnetic radiation source of sufficient energy and for a sufficient time to convert at least a portion of said organic photochromic material from one photochromic state to another such that a marked difference in molecular internal energy exists between the exposed and unexposed areas of the said member in order to form a latent image and softening said imaging layer with a developing liquid containing at least a partial solvent for said imaging layer to allow said photochromic material to differentially expand said insulating resin to form a raised image in the areas having the higher molecular energy level.

10. A method according to claim 9 in which said photochromic material comprises a spiropyran.

11. A method according to claim 9 in which said photochromic material comprises 6′-nitro-1,3,3-trimethylindolinobenzopyrylospiran.

References Cited

UNITED STATES PATENTS

| | | | |
|---|---|---|---|
| 3,149,120 | 9/1964 | Berman | 96—67 XR |
| 3,260,599 | 7/1966 | Lokken | 96—49 XR |

OTHER REFERENCES

Theoretical and Experimental Investigation of Photochromic Memory Techniques and Devices, pp. 90, 315, Aeronautical Systems Division 61–70, TR 210N37 (copy in 167) December 1961.

NORMAN G. TORCHIN, Primary Examiner

C. BOWERS, Assistant Examiner

U.S. Cl. X.R.

96—27, 36, 89, 90, 48